US011001731B2

(12) United States Patent
Potzmann

(10) Patent No.: US 11,001,731 B2
(45) Date of Patent: May 11, 2021

(54) RADIATION-CURABLE URETHANE (METH)ACRYLATES WITH RESIDUAL ISOCYANATE GROUPS

(71) Applicant: ALLNEX NETHERLANDS B.V.

(72) Inventor: Robert Potzmann, Buizingen (BE)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 223 days.

(21) Appl. No.: 15/772,836

(22) PCT Filed: Dec. 14, 2016

(86) PCT No.: PCT/EP2016/080994
§ 371 (c)(1),
(2) Date: May 2, 2018

(87) PCT Pub. No.: WO2017/108531
PCT Pub. Date: Jun. 29, 2017

(65) Prior Publication Data
US 2018/0320021 A1 Nov. 8, 2018

(30) Foreign Application Priority Data
Dec. 22, 2015 (EP) .................................... 15201929

(51) Int. Cl.
*C09D 175/16* (2006.01)
*C08G 18/48* (2006.01)
(Continued)

(52) U.S. Cl.
CPC ......... *C09D 175/16* (2013.01); *C08G 18/284* (2013.01); *C08G 18/4238* (2013.01);
(Continued)

(58) Field of Classification Search
CPC .................. C09D 175/16; C08G 18/284; C08G 18/4238; C08G 18/44; C08G 18/485;
(Continued)

(56) References Cited

U.S. PATENT DOCUMENTS 4,730,021 A * 3/1988 Zom .................. C08G 18/8175
524/457
5,300,615 A 4/1994 Meixner et al.
(Continued)

FOREIGN PATENT DOCUMENTS

DE 101 43 630 3/2003
EP 0 590 399 4/1994
(Continued)

OTHER PUBLICATIONS

International Search Report dated Mar. 23, 2017 in International Application No. PCT/EP2016/080994.

*Primary Examiner* — Robert S Walters, Jr.
(74) *Attorney, Agent, or Firm* — Wenderoth, Lind & Ponack, L.L.P.

(57) ABSTRACT

The present invention relates to urethane (meth)acrylates comprising residual isocyanate groups which are obtained from the reaction of: a) at least one di- or poly-isocyanate, and b) at least one hydroxyl-functional (meth)acrylic acid ester of at least one polymer chain which comprises: at least one (meth)acryloyl group, at least one free hydroxyl group and at least one polymer chain, wherein the equivalent ratio of OH groups to NCO groups is 0.05:1 to 0.66:1, a process for preparing thereof and their use in radiation-curable coating composition.

19 Claims, 1 Drawing Sheet

A    B

(51) Int. Cl.
| | |
|---|---|
| *C08G 18/67* | (2006.01) |
| *C08G 18/68* | (2006.01) |
| *C08G 18/81* | (2006.01) |
| *C08G 18/42* | (2006.01) |
| *C08G 18/28* | (2006.01) |
| *C08G 18/44* | (2006.01) |
| *C08G 18/63* | (2006.01) |
| *C08G 18/73* | (2006.01) |
| *C08G 18/75* | (2006.01) |
| *C08G 18/76* | (2006.01) |

(52) U.S. Cl.
CPC ........... *C08G 18/44* (2013.01); *C08G 18/485* (2013.01); *C08G 18/632* (2013.01); *C08G 18/672* (2013.01); *C08G 18/6795* (2013.01); *C08G 18/68* (2013.01); *C08G 18/73* (2013.01); *C08G 18/755* (2013.01); *C08G 18/7621* (2013.01); *C08G 18/8175* (2013.01)

(58) Field of Classification Search
CPC ............................ C08G 18/632; C08G 18/672; C08G 18/6795; C08G 18/68; C08G 18/73; C08G 18/755; C08G 18/7621; C08G 18/8175

See application file for complete search history.

(56) References Cited

U.S. PATENT DOCUMENTS

| | | |
|---|---|---|
| 5,919,834 A | 7/1999 | Downs et al. |
| 6,177,535 B1 | 1/2001 | Schwalm et al. |
| 6,599,955 B1 | 7/2003 | Weikard et al. |
| 2003/0050390 A1 | 3/2003 | Weikard et al. |
| 2006/0052571 A1 | 3/2006 | Heischkel et al. |
| 2006/0084713 A1 | 4/2006 | Bach et al. |
| 2006/0293484 A1 | 12/2006 | Kinney et al. |

FOREIGN PATENT DOCUMENTS

| | | |
|---|---|---|
| EP | 0 964 012 | 12/1999 |
| EP | 1 411 077 | 4/2004 |
| EP | 1 647 585 | 4/2006 |
| EP | 1 736 492 | 12/2006 |
| WO | 02/38688 | 5/2002 |
| WO | 2005/085369 | 9/2005 |

\* cited by examiner

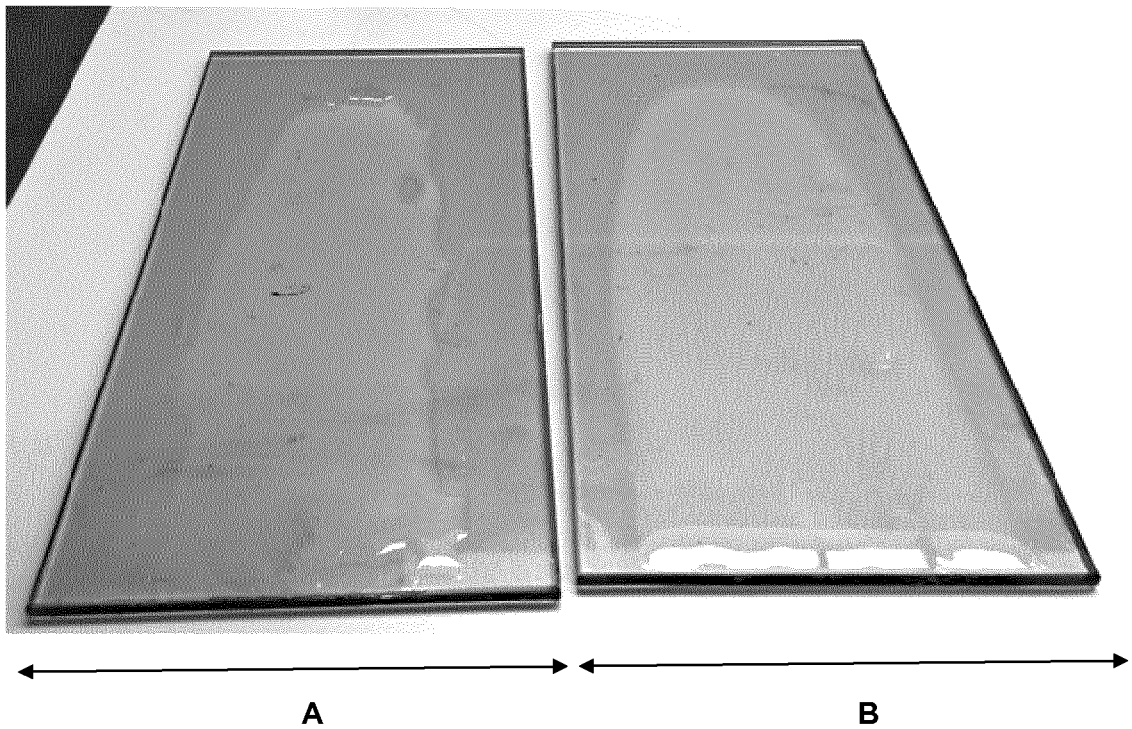

RADIATION-CURABLE URETHANE (METH)ACRYLATES WITH RESIDUAL ISOCYANATE GROUPS

TECHNICAL FIELD

The present invention generally relates to the field of radiation-curable urethane (meth)acrylates containing residual isocyanate groups and their use as radiation-curable coating compositions.

BACKGROUND ART

Urethane (meth)acrylates are obtained from the reaction of hydroxyl-functional esters of (meth)acrylic acid and poly- and/or di-isocyanates. Urethane (meth)acrylates are commonly used in radiation-curable coating compositions. The ethylenically unsaturated double bonds generally polymerize, by a polymerization reaction, commonly initiated by UV-active photoinitiators that are activated under the action of high energy radiation such as UV light or without photoinitiator by electron beam and so form a network. Radiation-curable coating compositions comprising urethane (meth)acrylates show the advantages of displaying a high conversion rate and a low energy consumption for curing. In addition, these radiation-curable coating compositions may be applied without solvent. While common urethane (meth)acrylates have no, or very limited residual isocyanate groups after synthesis, a special sub-group, urethane (meth)acrylates with residual isocyanate groups, exhibit both (meth)acrylic groups and isocyanate groups in the same molecule.

Radiation-curable coating compositions comprising urethane (meth)acrylates with residual isocyanate groups may be used for coating several kind of substrates like wood, glass and plastic. Furthermore, these compositions may be used in different radiation-curing systems intended for specific purposes. For instance, these compositions may be used in one-component systems for conformal coatings or as adhesion promoters on substrate like wood. Moreover, these compositions may be combined with alcohol, thiol or amine bearing resins and also be used in dual cure systems which are often used for preparing post-formable films or conformal coatings as well.

Several radiation-curable coating compositions comprising urethane (meth)acrylates in combination with residual isocyanate groups have already been disclosed in prior art. U.S. Pat. No. 6,599,955B1 describes a radiation-curable coating composition consisting of a mixture of urethane (meth)acrylate which contains both (meth)acryloyl groups and residual isocyanate groups and (meth)acrylates which contain (meth)acryloyl groups but contains no residual isocyanate groups and no-isocyanate-reactive groups. EP0964012A1 refers to a dual cure composition for adhesives which comprises a polyisocyanate prepolymer containing acrylic unsaturation and residual isocyanate functionality, a sulfonyl isocyanate and a catalyst containing both ether and morpholine groups. U.S. Pat. No. 6,177,535B1 describes urethane-functional prepolymers obtained by a isocyanate compound with a OH-containing component wherein the isocyanate compound may be a mixture of two different isocyanate compounds and/or the OH-containing component may be a mixture of two different OH-containing components.

However, there is still a need to develop radiation-curable urethane (meth)acrylates with residual isocyanate groups which display high stability in storage, good substrate wetting and allow obtaining coatings showing a good adhesion on different kind of substrates, for instance: wood, plastic, leather, metal, composite, ceramic, paper or mineral substrate like glass.

Technical Problem

The present invention aims to provide urethane (meth)acrylates with residual isocyanate groups which show high stability in storage, good substrate wetting and allow to obtain coatings having a good adhesion on different kind of substrates, namely: wood, plastic, leather, metal, composite, ceramic, paper or mineral substrate like glass.

General Description of the Invention

In order to overcome the above-mentioned technical problem, the present invention provides:

A urethane (meth)acrylate, comprising residual isocyanate groups, which is obtained from the reaction of:
a) at least one di- or poly-isocyanate, and
b) at least one hydroxyl-functional (meth)acrylic acid ester of at least one polymer chain which comprises: at least one (meth)acryloyl group, at least one free hydroxyl group and at least one polymer chain,
wherein the equivalent ratio of OH groups to NCO groups is comprised from 0.05:1 to 0.66:1.

The OH value is expressed in mgKOH/g and the isocyanate content is expressed in wt. %. Both can be measured by standard analytical techniques that are described in the experimental section of the present patent application. The mol/g OH groups can be calculated from the OH value by dividing by 56000 mg/mol. The NCO groups can be calculated from the NCO content by dividing by 4200 g/mol. Both amounts of OH groups and NCO groups are expressed in mol/g.

Another aspect of the invention is a radiation-curable coating composition comprising at least one urethane (meth)acrylate comprising residual isocyanate groups, which is obtained from the reaction of:
a) at least one di- or poly-isocyanate, and
b) at least one hydroxyl-functional (meth)acrylic acid ester of at least one polymer chain which comprises: at least one (meth)acryloyl group, at least one free hydroxyl group and at least one polymer chain,
wherein the equivalent ratio of OH groups to NCO groups is comprised from 0.05:1 to 0.66:1.

Another aspect of this invention is a method for coating the above-mentioned radiation-curable coating composition which comprises a step of applying the radiation-curable coating composition comprising a urethane (meth)acrylate with residual isocyanate groups according to the present invention on a substrate and then a step of curing the radiation-curable coating composition by submitting the coated substrate to the appropriate radiation.

Another aspect of the invention is a coated substrate obtained with the above-described method for coating. The substrate can be wood, plastic, leather, metal, composite, ceramic, paper or mineral substrate like glass.

BRIEF DESCRIPTION OF THE DRAWINGS

Preferred embodiments of the invention will now be described, by way of examples, with reference to the accompanying drawings in which:

FIG. 1 shows a picture of two glasses which are coated with either a composition according to example 6 (left side of the picture named A) or with a composition according to a comparative example (right side of the picture named B).

DESCRIPTION OF PREFERRED EMBODIMENTS

The present invention proposes a urethane (meth)acrylate comprising residual isocyanate groups, which is obtained from the reaction of:
a) at least one di- or poly-isocyanate, and
b) at least one hydroxyl-functional (meth)acrylic acid ester of at least one polymer chain which comprises: at least one (meth)acryloyl group, at least one free hydroxyl group and at least one polymer chain,
wherein the equivalent ratio of OH groups to NCO groups is comprised from 0.05:1 to 0.66:1.

In the context of the present invention, the equivalent ratio refers to the ratio of the OH groups of the at least one hydroxyl-functional (meth)acrylic acid ester of at least one polymer chain b) to the NCO groups of the at least one di- or poly-isocyanate a), when reacting both components a) and b) for obtaining the urethane (meth)acrylate with residual isocyanate groups. It means that the amounts of component a) and component b) are selected to provide an equivalent ratio of OH groups to NCO groups which is comprised from 0.05:1 to 0.66:1.

This step is conducted under conditions in order to obtain a urethane (meth)acrylate with residual isocyanate groups. The term "residual isocyanate groups" refers to the isocyanate groups remaining in the urethane (meth)acrylate obtained which have not reacted with OH groups in order to form a urethane bond. In the reaction of the OH group and the isocyanate group, both are consumed and a urethane bond is formed. This conversion results in a urethane (meth)acrylate which is substantially free of hydroxyl (OH) groups and bears basically equal amount of urethane bonds as OH groups used for its synthesis. Therefore for the final urethane (meth)acrylate, the amount of urethane bonds is equal to the OH groups used for its synthesis while the amount of isocyanate groups is reduced by the amount of OH groups. The ratio of isocyanate groups to urethane groups in the urethane (meth)acrylate with residual isocyanate groups results in:

(NCO groups–OH groups)/(OH groups).

This ratio reflects the ideal conversion and does not take into account the possible side reactions which might occur in the same time (allophanate formation, urea formation, etc. . . . ). As a result, the urethane (meth)acrylate which comprises residual isocyanate groups is substantially free of hydroxyl groups.

According to a preferred embodiment, the ratio of NCO groups to urethane bonds of the urethane (meth)acrylate obtained is comprised between 1.6 and 20, preferably between 2 and 10, and more preferably between 3 and 9.

The urethane(meth)acrylate obtained comprises residual isocyanate groups which means that it comprises per molecule in average at least 0.6 residual isocyanate group and preferably at least 1 residual isocyanate group. According to one embodiment, the urethane (meth)acrylate may comprise in average between 0.6 and 3 residual isocyanate groups per molecule.

The equivalent ratio of OH groups to NCO groups of the reactants, corresponding to components a) and b), before the reaction, may preferably be comprised from 0.05:1 to 0.66:1 and more preferably from 0.10:1 to 0.50:1 most preferably 0.10:1 to 0.33:1. Typically, the equivalent ratio of OH groups to NCO groups stands for the ratio of the amount of substance of OH groups in mol/gram and the amount of substance of NCO groups in mol/gram, normalized on one for the NCO group.

The urethane (meth)acrylate shows a significant NCO content. According to one embodiment, the urethane (meth)acrylate obtained comprises from 3 to 18 wt. % of NCO content, preferably from 4 to 15 wt. % of NCO content and more preferably from 5 to 13 wt. % of NCO content compared to the total weight of the urethane (meth)acrylate.

The urethane (meth)acrylate according to the present invention may preferably have an average molecular weight (Mn) which is comprised between 500 g·mol$^{-1}$ and 20000 g·mol$^{-1}$ and more preferably between 1000 g·mol$^{-1}$ and 10000 g·mol$^{-1}$.

According to one embodiment, the urethane (meth)acrylate may show a viscosity which is between 10 mPa·s and 200.000. mPa·s, more preferably between 50 mPa·s and 150.000 mPa·s, and most preferably between 100 mPa·s and 100.000 mPa·s at a temperature of 25° C. The viscosity may be measured by the method DIN EN ISO 3219.

The urethane (meth)acrylate includes one or several polymer chain(s) which may be branched or not branched. The urethane (meth)acrylate may comprise at least 1 polymer chain, at least 2 polymer chains, at least 3 polymer chains, at least 4 polymer chains or at least 5 polymer chains. When branched, the urethane (meth)acrylate may comprise between 2 and 5 polymer chains, preferably between 2 and 3 polymer chains. The at least one polymer chain may contain at least 3 monomers. The monomers may be linked by bonds which may be selected from the group consisting of: ester, ether, amide, urethane, urea, carbon-carbon and any mixtures thereof. According to a specific embodiment, the at least one polymer chain is selected from the group consisting of: polyether, polyester, polycarbonate, polysilicone and polysilicone-polyether copolymer.

According to one embodiment, the urethane (meth)acrylate may comprise between 1 and 5 (meth)acryloyl groups, preferably between 1 and 4 (meth)acryloyl groups, more preferably between 1 and 3 and most preferably between 1 and 2 (meth)acryloyl groups. In particular, the component b) may comprise at least 1 (meth)acryloyl group, at least 2 (meth)acryloyl groups, at least 3 (meth)acryloyl groups, at least 4 (meth)acryloyl groups or at least 5 (meth)acryloyl groups. According to one embodiment, the component b) may comprise less than 5 (meth)acryloyl groups, less than 4 (meth)acryloyl groups, less than 3 (meth)acryloyl groups or less than 2 (meth)acryloyl groups. According to one embodiment, the at least one (meth)acryloyl group is preferably a terminal and/or a pendant (meth)acryloyl group namely located at the end of the at least one polymer chain or pending within the backbone of the at least one polymer chain, more preferably located at the end of the at least one polymer chain.

The component a) is at least one di- or poly-isocyanate. The component a) refers to a compound containing at least two isocyanate groups. Typically, the polyisocyanate contains not more than six isocyanate groups, more preferably not more than three isocyanate groups. Polyisocyanates may be selected from one or more aliphatic, cycloaliphatic, aromatic, heterocyclic polyisocyanates well known in the art and mixtures thereof. Examples of aliphatic and cycloaliphatic polyisocyanates that may be used are: 1,6-diisocyanatohexane (hexamethylene diisocyanate, HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Examples of aromatic polyisocyanates that may be used are 1,4-diisocyanatobenzene (BDI), 2,4-diisocyanatotoluene (toluene diisocyanate (TDI)), 1,1'-methylenebis[4-isocyanatobenzene] (MDI), xylilene diisocyanate (XDI), 1,5-naphtalene diisocyanate (NDI), tolidine diisocyanate (TODD, tetramethylxylylene diisocyanate (TMXDI) and p-phenylene diisocyanate (PPDI). Other examples of polyisocyanates that may be used in the context of the invention are tri methyl 1,6 hexamethylene diisocyanate, 4,4'-diisocyanatodicyclohexylmethane, 4,4'-diisocyanatodiphenylmethane, the technical mixtures with 2,4-diisocyanatodiphenylmethane and also the higher homologues of above mentioned diisocyanates, 2,4-diisocyanatotoluene and technical mixtures of them with 2,6-diisocyanatotoluene, as well as the copolymerization product of 3-isopropenyl-a,a'-dimethylbenzyl isocyanate (TMI). Polyisocyanates containing more than two isocyanate groups are for example the derivatives of above mentioned diisocyanates like 1,6-diisocyanatohexane biuret and isocyanurate. Preferred are polyisocyanates, most preferred are aliphatic polyisocyanates.

According to a specific embodiment, the component a) is selected from the group consisting of hexamethylene diisocyanate (HDI), 5-isocyanato-1-isocyanatomethyl-1,3,3-trimethyl-cyclohexane (isophorone diisocyanate, IPDI); 2,4-diisocyanatotoluene (toluene diisocyanate (TDI)), their isocyanurate containing homopolymers and any mixtures thereof.

The component b) is at least one hydroxyl-functional (meth)acrylic acid ester of at least one polymer chain which comprises: at least one (meth)acryloyl group, at least one free hydroxyl group (OH group) and at least one polymer chain. The component b) is a polymer. In the context of the invention, the term "polymer" refers to a sequence of at least 3 monomer units, which are covalently bound to at least one other monomer unit or other reactant. The urethane (meth)acrylate according to the invention is a polymer as well.

According to a specific embodiment, the component b) may preferably meet the following criteria, which corresponds to a definition provided by the European Chemical agency (ECHA):
(1) Over 50 percent of the weight for that substance consists of polymer molecules (see definition below); and,
(2) The amount of polymer molecules presenting the same molecular weight must be less than 50 weight percent of the substance.

According to one embodiment, the urethane (meth)acrylate according to the present invention may preferably meet the criteria (1) and (2) as previously defined as well.

The component b) may preferably comprise in average between 1 and 5 (meth)acryloyl groups, preferably between 1 and 4 (meth)acryloyl groups, more preferably between 1 and 3 and most preferably between 1 and 2 (meth)acryloyl groups per molecule of component b). In particular, the component b) may comprise at least 1 (meth)acryloyl group, at least 2 (meth)acryloyl groups, at least 3 (meth)acryloyl groups, at least 4 (meth)acryloyl groups or at least 5 (meth)acryloyl groups. According to one embodiment, the component b) may comprise less than 5 (meth)acryloyl groups, less than 4 (meth)acryloyl groups, less than 3 (meth)acryloyl groups or less than 2 (meth)acryloyl groups. According to one embodiment, the at least one (meth)acryloyl group is preferably a terminal and/or a pendant (meth)acryloyl group namely located at the end of the at least one polymer chain or pending within the backbone of the at least one polymer chain, more preferably located at the end of the at least one polymer chain.

The component b) includes one or several polymer chain (s) which may be branched or not branched. The component b) may comprise at least 1 polymer chain, at least 2 polymer chains, at least 3 polymer chains, at least 4 polymer chains or at least 5 polymer chains. When branched, the component b) may comprise between 2 and 5 polymer chains, preferably between 2 and 3 polymer chains. The at least one polymer chain may contain at least 3 monomers. The monomers may be linked by bonds which may be selected from the group consisting of: ester, ether, amide, urethane, urea, carbon-carbon and any mixtures thereof. According to a specific embodiment, the at least one polymer chain is selected from the group consisting of: polyether, polyester, polycarbonate, polysilicone and polysilicone-polyether copolymer and any mixtures thereof.

The component b) may include in average between 1 and 5 free OH groups, preferably between 1 and 4 free OH groups, more preferably between 1 and 3 free OH groups and most preferably between 1 and 2 free OH groups per molecule of component b). According to a preferred embodiment, the component b) comprises in average one free OH group per molecule of component b). The OH groups may be primary, secondary or tertiary. Preferably the OH groups are primary or secondary and most preferably they are primary OH groups. The OH group can be pending within the chain or be a terminal group at the end of the at least one polymer chain. In particular, the at least one free hydroxyl group is preferably a terminal hydroxyl group, namely located at the end of the polymer chain. According to one embodiment the component b) may possibly be in a mixture with another compound which has no free OH groups.

According to a specific embodiment, the component b) may comprise 3 branched polymer chains wherein in average 2 of these polymer chains comprise at least one (meth)acryloyl group per polymer chain, preferably at least one terminal (meth)acryloyl group per polymer chain and one of the polymer chain comprises a pendant hydroxyl group, preferably a free terminal hydroxyl group.

The component b) may be preferably selected from the group consisting of: hydroxyl-functional silicone acrylates, hydroxyl-functional polyether acrylates, hydroxyl-functional polyester acrylates, hydroxyl-functional urethane acrylates, hydroxyl-functional epoxy acrylates, as well as copolymers and any mixtures thereof.

According to a specific embodiment, the component b) may be preferably selected from the group consisting of: the hydroxyl-functional polyether acrylates the hydroxyl-functional polyester acrylates and any mixtures thereof.

In particular, the component b) may preferably show an average molecular weight which is comprised between 300 $g \cdot mol^{-1}$ and 20000 $g \cdot mol^{-1}$, more preferably between 500 $g \cdot mol^{-1}$ and 10000 $g \cdot mol^{-1}$.

The component b) may preferably be obtained from the reaction of at least one hydroxyl-containing polymer comprising at least 2 hydroxyl groups and at least one (meth)acrylic acid. The at least 2 hydroxyl groups may be either pendant within the polymer chain of the hydroxyl-containing polymer or may be terminal, namely located at the end of one polymer chain of the at least one hydroxyl-containing polymer. According to one embodiment, at least one hydroxyl group of the hydroxyl-containing polymer is a terminal hydroxyl group.

The ratio of (meth)acrylic acid and OH groups may preferably be chosen in such a way that after the reaction between the at least one hydroxyl-containing polymer and the at least one (meth)acrylic acid, at least one hydroxyl function remains free. The at least one hydroxyl-containing polymer may be branched or not branched and may comprise one or more polymer chains.

The at least one hydroxyl-containing polymer may comprise at least 2 hydroxyl groups and preferably at least 3 hydroxyl groups. According to one embodiment, the at least one hydroxyl-containing polymer may comprise between 2 and 6 hydroxyl groups and preferably between 3 and 5 hydroxyl groups. The at least one hydroxyl-containing polymer may be preferably selected from the group consisting of hydroxyl-functional silicones, hydroxyl-functional polyesters, hydroxyl-functional polyethers, hydroxyl-functional urethanes as well as copolymers and mixtures thereof. According to a preferred embodiment, the at least one hydroxyl-containing polymer is selected from the group consisting of: the hydroxyl-functional polyesters and the hydroxyl-functional polyethers. In particular, the at least one hydroxyl-containing polymer may show an average molecular weight comprised between 200 g·mol$^{-1}$ and 20000 g·mol$^{-1}$ and more preferably between 400 g·mol$^{-1}$ and 10000 g·mol$^{-1}$.

The at least one (meth)acrylic acid may preferably be selected from the group consisting of: acrylic acid, methacrylic acid and self-condensates of both.

Different types of reactions can be used to obtain the component b) including esterification reactions, ring opening reactions and urethanization reactions. Preferred are the esterification reactions which are conducted under conditions for obtaining a hydroxyl-functional (meth)acrylic acid ester of at least one polymer chain which comprises: at least one (meth)acryloyl group, at least one free hydroxyl group and at least one polymer chain. It means that the hydroxyl-containing polymer is partially esterified with the (meth)acrylic acid and that at least one hydroxyl group remains free at the end of the reaction. The reaction is preferably carried out by azeotropic distillation at a temperature comprised between 100° C. and 130° C. and preferably between 110° C. and 120° C. The reaction for preparing the component b) may optionally include at least one inhibitor. In particular, the at least one inhibitor may be selected from the group consisting of: phenols, cresols and/or hydroquinones, quinones and/or phenothiazines any mixtures thereof. Preferred are the hydroquinones and the quinones.

According to a specific embodiment of the invention, the urethane (meth)acrylate comprising residual isocyanate groups may be obtained from the reaction of:
a) at least one di- or poly-isocyanate,
b) at least one hydroxyl-functional (meth)acrylic acid ester of at least one polymer chain which comprises: at least one (meth)acryloyl group, at least one free hydroxyl group and at least one polymer chain, and
c) at least one monohydric alcohol, which is not a polymer, containing at least one (meth)acryloyl group,
wherein the equivalent ratio of OH groups to NCO groups is comprised from 0.05: to 0.66:1.

In this case, the OH groups refers to the sum of the OH groups of the at least one hydroxyl-functional (meth)acrylic acid ester of at least one polymer chain b) and the at least one monohydric alcohol containing at least one (meth)acryloyl group c). The NCO groups are those coming from the at least one di- or poly-isocyanate a). Thus, in other words, it means that according to this embodiment of the invention:
the equivalent ratio of OH groups of the at least one hydroxyl-functional (meth)acrylic acid ester of at least one polymer chain b) and the at least one monohydric alcohol containing at least one (meth)acryloyl group c) to NCO groups of the at least one di- or poly-isocyanate a) is comprised from 0.05:1 to 0.66:1 and
the equivalent ratio of OH groups of the at least one hydroxyl-functional (meth)acrylic acid ester of at least one polymer chain b) to NCO groups of the at least one di- or poly-isocyanate a) is comprised from 0.05:1 to 0.66:1, as previously defined.

The component c) is at least one monohydric alcohol containing at least one (meth)acryloyl group which is not a polymer. The at least one monohydric alcohol containing at least one (meth)acryloyl group c) is preferably a monomer. According to one embodiment, the component c) has a ratio of OH groups to double bonds which is between 1:0.5 and 1:4, preferably between 1:0.75 and 1:3, and more preferably between 1:0.9 and 1:2.

The component c) may preferably be selected in the group consisting of: hydroxyethylacrylate (HEA), hydroxypropylacrylate (HPA), hydroxyethylmethacrylate, hydroxybutylacrylate, hydroxybutylmethacrylate, glycerineacrylate-methacrylate, carduraacrylate and any mixtures thereof. In particular, the component c) may be selected from the group consisting of: hydroxyethylacrylate (HEA), hydroxyethylmethacrylate and any mixtures thereof.

According to a specific embodiment, the ratio of amount in wt. % of component b) to component c) is between 10:90 and 100:0, preferably is between 25:75 and 100:0 and more preferably is between 50:50 and 90:10.

According to a specific embodiment of the invention, the urethane (meth)acrylate comprising residual isocyanate groups may be obtained from the reaction of:
a) at least one di- or poly-isocyanate,
b) at least one hydroxyl-functional (meth)acrylic acid ester of at least one polymer chain which comprises: at least one (meth)acryloyl group, at least one free hydroxyl group and at least one polymer chain, and
d) at least one polyol compound which does not comprise (meth)acryloyl group,
wherein the equivalent ratio of OH groups from component b) to NCO groups from component a) is comprised from 0.05:1 to 0.66:1.

The component d) is at least one polyol compound which does not include any (meth)acryloyl group. The component d) comprises at least 2 hydroxyl groups. The compounds d) preferably do not include any double bond between 2 atoms of carbon (C=C). Preferably, the at least one component d) is selected from the group consisting of: ethylene glycol, propylene glycol, diethylene glycol, dipropylene glycol, triethylene glycol, tripropylene glycol, polyethylene glycol, polypropylene glycol hexanediol, polycaprolactone diol, cyclohexanedimethanol, 2-ethylhexan-1,3-diol, and any mixtures thereof. In this case, when the urethane (meth)acrylate is obtained from the reaction of at least one component d) as well, the equivalent ratio of OH groups to NCO groups, which is comprised from 0.05:1 to 0.66:1, does not include the OH groups of the component d) but only those of the component b).

According to one embodiment, the urethane (meth)acrylate comprising residual isocyanate groups may be obtained from the reaction of at least one component a), at least one component b), at least one component c) and at least one component d). In this case, the equivalent ratio of OH groups to NCO groups, which is comprised from 0.05:1 to 0.66:1, does not include the OH groups of the component d) but only those of the component b) and the component c).

The urethane (meth)acrylate comprising residual isocyanate groups of the present invention may be obtained by a process comprising the step of:

1) Reacting at least one di- or poly-isocyanate a) with at least one hydroxyl-functional (meth)acrylic acid ester of at least one polymer chain b) which comprises: at least one (meth)acryloyl group, at least one free hydroxyl group and at least one polymer chain.

This step is conducted under conditions in order to obtain a urethane (meth)acrylate with residual isocyanate groups. The ratio of NCO groups to urethane bonds of the urethane (meth)acrylate obtained is comprised between 1.6 and 20, preferably between 2 and 10, and more preferably between 3 and 9. Thereof, the amounts of the reactants (corresponding to component a) and component b)) are selected to provide an equivalent ratio of OH groups to NCO groups which is comprised from 0.05:1 to 0.66:1.

According to one embodiment, the process for preparing the urethane (meth)acrylate according to the invention further comprises admixing an inhibitor in step 1). Suitable inhibitors may be for instance: phenols, cresols, hydroquinones quinones and/or phenothiazines and any mixtures thereof. Preferred are cresols and phenothiazines. The reaction temperature is comprised between 30° C. and 120° C. and more preferably between 50° C. and 90° C.

The step 1) of the process for preparing the urethane (meth)acrylate may optionally include reacting a monohydric alcohol, which is not a polymer, containing at least one (meth)acryloyl group c) as previously defined.

The step 1) of the process for preparing the urethane (meth)acrylate may optionally include reacting at least one polyol compound which does not comprise (meth)acryloyl group d) as previously defined.

The present invention also refers to a radiation-curable coating composition comprising at least one a urethane (meth)acrylate comprising residual isocyanate groups, which is obtained from the reaction of:
a) at least one di- or poly-isocyanate, and
b) at least one hydroxyl-functional (meth)acrylic acid ester of at least one polymer chain which comprises: at least one (meth)acryloyl group, at least one free hydroxyl group and at least one polymer chain,
wherein the equivalent ratio of OH groups to NCO groups is comprised from 0.05: to 0.66:1.

According to a specific embodiment, the radiation-curable coating composition may comprise at least one urethane (meth)acrylate comprising residual isocyanate groups, which is obtained from the reaction of at least one component c) and/or at least one component d) as previously defined, in addition to the at least one component a) and the at least one component b).

The term "radiation-curable coating composition" stands for a composition which can be cured under exposition to radiation and which forms a coating after the curing step.

The radiation-curable coating composition may optionally comprise at least one photoinitiator. The at least one photoinitiator should preferably provide with a dry-touch effect which means that the radiation-curable coating composition is deeply cross-linked after the curing step.

The at least one photoinitiator may be preferably selected from the group consisting of α-hydroxyketones, α-aminoketones, benzildimethyl-ketals, acyl phosphines, benzophenone derivatives, thioxanthones and blends of these and more preferably is selected from the group consisting of α-hydroxyketones, benzophenone, acyl phosphines and any mixtures thereof and most preferably is selected from the group consisting of hydroxyketones, acyl phosphines and any mixtures thereof. In particular, the radiation-curable coating composition may comprise from 0 wt. % to 10 wt. % of photoinitiator compared to the total weight of the radiation-curable coating composition.

The radiation-curable coating composition may optionally include at least one solvent in an amount from 0 wt. % to 70 wt. % compared to the total weight of the radiation-curable coating composition. The solvents that are suitable for use in the present invention include but are not limited to the diethyleneglycol monomethyl ether (DOWANOL®DM), dipropyleneglycol monomethyl ether (DOWANOL®DPM), dimethyl esters or di-isobutyl esters of adipic, glutaric, succinic or phthalic acids and their blends, the ethyl-3-ethoxypropionate (Ektapro®EEP, Eastman), the 2,2,4-trimethyl-1,3-pentanedioldiisobutirate (Kodaflex®TXBI, Eastman), ethylene carbonate and propylene carbonate, propyleneglycol diacetate (DOWANOL®PGDA), dipropylene glycol dimethyl ether (PROGLYDE®DMM), ethyl lactate, butylacetate, methylisobutylketone (MIBK) and any mixtures thereof.

The radiation-curable coating composition may optionally further include at least one radiation-curable resin different from the urethane (meth)acrylate according to the present invention. According to a specific embodiment, the at least one radiation-curable resin may be selected from the group consisting of: urethane acrylates, epoxy acrylates, amino acrylates, ester acrylates, silicone acrylate and any mixtures thereof. The amount of the at least one radiation-curable resin may be preferably comprised from 0 wt % to 70 wt % compared to the total weight of the radiation-curable coating composition.

The radiation-curable coating composition according to the invention may optionally comprise at least one inert resin, which does not take part in the polymerization reaction like the ones described in e.g. WO2002/38688, WO2005/085369, EP1411077 and U.S. Pat. No. 5,919,834. Examples of such optional inert resins typically include hydrocarbons (such as styrene based hydrocarbon resins), styrene allyl alcohol polymers, polyesters, styrene maleic anhydride polymers and halfesters thereof, (poly)urethane resins, polyethylenevinylacetate resins, polyvinylchloride resins, polyesters, chlorinated polyesters, polyvinyl butyraldehyde, polydiallylphtalate, chlorinated polyolefin resins and/or ketone resins. Preferably, the at least one inert resin does not contain any hydroxyl group.

According to one embodiment, the radiation-curable coating composition may further comprise at least one additive selected in the group consisting of rheology modifiers, leveling agents, wetting agents, slip additives, stabilizers, anti-foam agents, alkoxysilanes, adhesion promoting agents water and any mixture thereof.

The radiation-curable coating composition may optionally comprise at least one monomer, also widely known as reactive diluent. When (meth)acrylated, the at least one monomer may be selected from the group consisting of the (meth)acrylated monomers may be monofunctional, difunctional, or trifunctional, tetrafunctional, pentafunctional or hexafunctional(meth)acrylate monomers. Representative examples of such monomers include but are not limited to: Acrylate monomer with carboxylic acid function such as 2-carboxyethyl acrylate, (meth)acrylic acid, ethylene glycol di(meth)acrylate, ethoxylated bisphenol A di(meth)acrylate esters, isosorbide di(meth)acrylate, tris(2-hydroxyethyl) isocyanurate tri(meth)acrylate as well as the di(meth)acrylate, alkyl (such as isobornyl, isodecyl, isobutyl, n-butyl, t-butyl, methyl, ethyl, tetrahydrofurfuryl, cyclohexyl, n-hexyl, iso-octyl, 2-ethylhexyl, n-lauryl, octyl or decyl) or hydroxy alkyl (such as 2-hydroxyethyl and hydroxy propyl) esters of acrylic acid or methacrylic acid, phenoxyethyl(meth)acrylate, nonylphenolethoxylate mono(meth)acrylate, 2-(-2-ethoxyethoxy)ethyl(meth)acrylate, 2-butoxyethyl(meth)acrylate, butyleneglycol di(meth)acrylate and tri(meth)acrylate, 1,6-hexanediol di(meth)acrylate, ethoxylated and/or propoxylated hexanediol di(meth)acrylate, tricyclodecanedi(meth)acrylate, tricyclodecanedimethanol di(meth)acrylate, pentaerythritol di(meth)acrylate and tri(meth)acrylate and tetra(meth)acrylate and the ethoxylated and/or propoxylated derivatives thereof, propylene glycol di(meth)acrylate, neopentyl glycol di(meth)acrylate, ethoxylated and/or propoxylated neopentylglycol di(meth)acrylate, hexamethylene glycol di(meth)acrylate, 4,4'-bis(2-acryloyloxyethoxy)diphenylpropane, di- or trimethylolpropane tri(meth)acrylate and the ethoxylated or/and propoxylated derivatives thereof, phenylglycidylether (meth)acrylate, the (meth)acrylates obtained from the esterification with (meth)acrylic acid of aliphatic glycidyl ethers. The radiation-curable coating composition may preferably comprise from 0 wt % to 70 wt. % of monomer compared to the total weight of the radiation-curable coating composition.

The radiation-curable coating composition may optionally comprise at least one pigment and/or at least one matting agent.

The at least one pigment may be an inorganic pigment and selected from the group consisting of: titanium oxide, zinc oxide, antimony oxide, calcium carbonate, fumed silica, aluminium oxide and any mixture thereof. According to one embodiment, the at least one pigment may be an organic pigment and selected from the group consisting of: acid and base dye pigments, diazo pigments, monoazo pigment, phthalocyanine pigments, quinacridone pigments and any mixtures thereof.

The at least one matting agent may preferably be an inorganic matting agent, in particular an inorganic oxide matting agent. Preferred matting agents are selected from the group consisting of: $SiO_2$, $Al_2O_3$, $AlPO_4$, $MgO$, $TiO_2$, $ZrO_2$, $Fe_2O_3$ and mixtures thereof. The oxides may be in a variety of forms, including gelled, precipitated, fumed, colloidal, etc. Inorganic oxides may also include natural minerals, processed/activated minerals, montmorillonite, attapulgite, bentonite, diatomite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof.

Another aspect of the invention is a method for coating a radiation-curable coating composition as previously described which comprises the step of applying the radiation-curable coating composition on a substrate and then the step of curing the radiation-curable coating composition by submitting the coated substrate to the radiation. The curing step is carried out until the radiation-curable coating composition forms a coating on the substrate. The radiation is preferably the actinic radiation.

Various types of actinic radiation can be used such as ultraviolet (UV) radiation, gamma radiation, and electron beam. A preferred means of radiation curing is ultraviolet radiation. Any ultraviolet light source, as long as part of the emitted light can be absorbed by the photoinitiator (system), may be employed as a radiation source. According to one embodiment, the UV radiations are UV-A, UV-B, UV-C and/or UV-V radiations. The UV light source may be preferably selected from the group consisting of high or low pressure gallium lamps, mercury lamps, a cold cathode tube, xenon lamp, a black light, an UV LED, a UV laser and a flash light.

The substrate may be selected from the group consisting of: wood, plastic, leather, metal, composite, ceramic, paper or mineral substrate like glass. The radiation-curable coating composition according to the present invention allows obtaining coatings with satisfying properties on any kind of substrate. The present invention also refers to a coated substrate obtained by the method for coating previously described.

Another aspect of the invention is the use of the urethane (meth)acrylate comprising residual isocyanate groups or the radiation-curable coating composition comprising the urethane (meth)acrylate comprising residual isocyanate groups for dual cure application, for instance, for preparing post-formable films.

The urethane (meth)acrylate according to the present invention or the radiation-curable coating composition comprising the urethane (meth)acrylate comprising residual isocyanate groups may also be used for conformal coating or as an adhesion promoter.

All the embodiments previously mentioned may be individually implemented or may be combined within reason.

The invention is now further described in more details in the following examples, which in no way intend to limit the invention or its applications.

Experimental Data

The analysis was done according to following standards:
ISO 10283 for NCO content;
DIN 53240 T2 for hydroxyl value and
DIN EN ISO 3219 for viscosity, at 25° C.

List of Materials:

The partly acrylated poly-block-silicone-polyether capping agent is a tri block copolymer consisting of a central polydimethylsiloxane block and two pending polyethylene glycol blocks, which is partly acrylated. The compound is commercially available under the trade name EBECRYL® 350 from company Allnex.

The polycarbonate is the reaction product of carbonic acid dimethylester with 3 methyl-1,5-pentanediol. It is commercially available under the trade name Desmophen® C2716 from company Covestro.

Polyether V657® is an ethoxylated trimethylolpropane with an average ethoxylation degree of 12. The polyether is commercially available under the trade name Polyether V657® from company Covestro.

Desmophen® 1990 is a mixed ethoxylated and propoxylated trimethylolpropane with an average ethoxylation degree of 4. This polyether is commercially available under the trade name Desmophen® 1990 from company Covestro.

Hexamethylene diisocyanate (HDI) homopolymer (Desmodur® N3600 or Desmodur® N3300), isophorone diisocyanate (IPDI), and toluene diisocyanate (TDI) are commercially available form company Covestro.

Adipic acid, butanediol, phenothiazine, para toluenesulfonic acid, hydroquinone, toluene are commercially available at Sigma-Aldrich Co. LLC.

Example 1: Synthesis of a Hydroxyl-Functional Polyester

In a flask equipped with a dean stark, a column, a condenser and a gas in and outlet 550 g butanediol and 650 g adipic acid were placed. A slight nitrogen flow was ensured while heating the mixture up to 200° C. Water was continuously removed from the reaction mixture until an OH value of 168 mg KOH/g was reached. The final product is a waxy solid at room temperature and is a colorless liquid when heated to 60° C.

Example 2: Synthesis of Hydroxyl-Functional Polyester Acrylate

In a flask equipped with a dean stark, a condenser and gas in and outlet 1100 grams of hydroxyl-functional polyester from example 1, 125 grams of acrylic acid, 800 grams of toluene as well as 1.1 grams of hydroquinone and 10.2 grams of para toluenesulfonic acid were placed. A moderate airflow was ensured and the reaction was heated to 117° C. and water was continuously distilled off. During the reaction the mass temperature rose to 122° C. Samples were taken and acid value was determined. After reaching 5 acid value 30 grams of glycidylmethacrylate were added and the toluene was removed. A waxy solid with an OH value of 82 mg KOH/g was obtained.

Example 3: Synthesis of Hydroxyl-Functional Polycarbonate Acrylate

In a flask equipped with a dean stark, a condenser and gas in and outlet 1100 grams of Desmophen® C 2716, 128 grams of acrylic acid, 800 grams of toluene as well as 1.1 grams of hydroquinone and 10.2 grams of para toluenesulfonic acid were placed. A moderate airflow was ensured and the reaction was heated to 115° C. and water was continuously distilled off. During the reaction the mass temperature rose to 122° C. Samples were taken and acid value was determined. After reaching 5 acid value 30 grams of glycidylmethacrylate were added and the toluene was removed. A colorless liquid with a viscosity of 982 mPa·s and an OH value of 92 mgKOH was obtained.

Example 4: Synthesis of Hydroxyl-Functional Polyether Acrylate

In a flask equipped with a dean stark, a condenser and gas in and outlet 543.8 grams of Polyether V657®, 135.4 grams of Desmophen® 1990, 194 grams of acrylic acid, 585 grams of toluene as well as 2.5 grams of hydroquinone and 4.8 grams of para toluenesulfonic acid were placed. A moderate airflow was ensured and the reaction was heated to 110° C. During the reaction the mass temperature rose to 120° C. and water was continuously distilled off. Samples were taken and acid value was determined. After reaching 5 acid value 30 grams glycidylmethacrylate were added and the toluene was removed. A slightly yellow liquid with a viscosity of 192 mPa·s and a OH value of 84 mgKOH/g was obtained.

Example 5: Hydroxyl-Functional Polyether Acrylate

In a flask equipped with a dean stark, a condenser and gas in and outlet 1091 g Polyether V657®, 241 g acrylic acid, 585 g toluene as well as 4.0 g hydroquinone and 8.22 g para toluenesulfonic acid were placed. A moderate airflow was ensured and the reaction was heated to 110° C. and water was continuously distilled off. During the reaction the mass temperature rose to 116° C. Samples were taken and acid value was determined. After reaching 5 acid value 30 g glycidylmethacrylate were added and the toluene was removed. A slightly yellow liquid with a viscosity of 213 mPa·s and a OH value of 75 mgKOH/g was obtained.

Examples 6-15: Urethane (Meth)Acrylate According to the Present Invention

Urethane (meth)acrylates comprising residual isocyanate groups according to the present invention were prepared starting from one of the component b) prepared according to examples 2 to 5. Furthermore, in addition to examples 2 to 5, a partly acrylated poly-block-silicone-polyether (commercially available under the name of Ebecryl® 350, from Allnex) has been used as component b) as well.

Examples 2 to 5 and Ebecryl®350 has each been reacted with at least one diisocyanate selected from the group consisting of: Hexamethylene diisocyanate (HDI) homopolymer (Desmodur® N3600 or Desmodur® N3300, available from Allnex), isophorone diisocyanate (IPDI), and toluene diisocyanate (TDI).

Examples 7, 12 and 13 have been obtained from the additional reaction of a component c) which is 2-hydroxyethyl acrylate (HEA).

Comparative example has been obtained from the reaction of HDI homopolymer (Desmodur® N3600) and HEA.

Examples 6 to 15 and the comparative example have been prepared according to the following process:

The reaction for producing urethane (meth)acrylates comprising residual isocyanate groups according to examples 6-15 was carried out in a flask equipped with a mechanical stirrer a condenser and gas in and outlet. Each reaction, examples 6-15 as well as the comparative example, was stabilized by adding 100 ppm phenothiazine. The reactants have been admixed in air atmosphere at room temperature, afterwards heated to 60° C. and held for 18 hours. The viscosity and NCO content of the urethane acrylate obtained are described in table 1. Examples 6 to 15 all show a satisfying viscosity while displaying high NCO wt %.

TABLE 1

| | Desmoduit ® N 3300 (grams) | Desmoduit ® N 3600 (grams) | IPDI (grams) | TDI (grams) | Ebecryl ® 350 (grams) | Ex. 2 (grams) | Ex. 3 (grams) | Ex. 4 (grams) |
|---|---|---|---|---|---|---|---|---|
| Ex. 6 | | 65.3 | | | | 34.7 | | |
| Ex. 7 | | 78.9 | | | | 11.6 | | |
| Ex. 8 | | 67.1 | | | | | 32.9 | |
| Ex. 9 | | 63.4 | | | 36.6 | | | |
| Ex. 10 | | 63 | | | | | | |
| Ex. 11 | 67 | | | | | | | 33 |
| Ex. 12 | 74.55 | | | | | | | 14 |
| Ex. 13 | 72.16 | | | | | | | 27.27 |
| Ex. 14 | | | 52.94 | | | | | |
| Ex. 15 | | | | 53.1 | | | | |
| Comparative | | — | 88.72 | | | | | |

TABLE 1-continued

| example | Ex. 5 (grams) | HEA (grams) | Ratio NCO | Ratio OH | Viscosity mPa·s, 25° C. | NCO Wt. % | Ratio of NCO groups to urethane bonds |
|---|---|---|---|---|---|---|---|
| Ex. 6 | | | 1 | 0.14 | 5981 | 14.5 | 6.04 |
| Ex. 7 | | 9.5 | 1 | 0.23 | 8026 | 13.95 | 3.37 |
| Ex. 8 | | | 1 | 0.15 | 13383 | 12.48 | 5.80 |
| Ex. 9 | | | 1 | 0.17 | 4682 | 6.62 | 4.77 |
| Ex. 10 | 37 | | 1 | 0.16 | 12800 | 8.85 | 5.22 |
| Ex. 11 | | | 1 | 0.16 | 5401 | 12.52 | 5.41 |
| Ex. 12 | | 11.45 | 1 | 0.31 | 11029 | 11.62 | 2.18 |
| Ex. 13 | | 5.57 | 1 | 0.25 | 6843 | 12.53 | 3.04 |
| Ex. 14 | 47.06 | | 1 | 0.15 | 186 | 17.66 | 6.76 |
| Ex. 15 | 46.84 | | 1 | 0.12 | 84 | 14.61 | 7.68 |
| Comparative example | | 10.73 | 1 | 0.19 | 3932 | 15.10 | 4.26 |

Glass Application:

The compositions of example 6 and of the comparative example were both applied on glass with a 150 μm doctor blade resulting in the same thickness. After 24 hours, both compositions have been cured by electron beam exposure. FIG. 1 shows pictures of the both glasses which are coated either with a composition of example 6 or with a composition of comparative example. The glass located at the left side of the picture (side A) corresponds to the one coated with a composition of comparative example whereas the one located at the right side (side B) corresponds to the one coated with a composition of example 6. Surprisingly, after storage for one day, the comparative example showed significant dewetting of the surface while example 6 according to the present invention still had a nice appearance.

The invention claimed is:

1. A urethane (meth)acrylate comprising residual isocyanate groups, which is obtained from the reaction of:
   a) at least one di- or poly-isocyanate,
   b) at least one hydroxyl-functional (meth)acrylic acid ester of at least one polymer chain which comprises: at least one (meth)acryloyl group, at least one free hydroxyl group and at least one polymer chain, and
   c) optionally, at least one monohydric alcohol, which is not a polymer, containing at least one (meth)acryloyl group,
   wherein the equivalent ratio of OH groups of the at least one hydroxyl-functional (meth)acrylic acid ester of at least one polymer chain b) and, if present, the at least one monohydric alcohol, which is not a polymer, containing at least one (meth)acryloyl group c) to NCO groups of the at least one di-or poly-isocyanate a) is 0.05:1 to 0.66:1.

2. The urethane (meth)acrylate according to claim 1, wherein the ratio of NCO groups to urethane bonds in the urethane (meth)acrylate is between 1.6 and 20.

3. The urethane (meth)acrylate according to claim 1, wherein the NCO content is comprised from 3 wt. % to 18 wt % compared to the total weight of the urethane (meth)acrylate.

4. The urethane (meth)acrylate according to claim 1, which has an average molecular weight which is between 500 g/mol and 20000 g/mol.

5. The urethane (meth)acrylate according to claim 1, wherein the at least one hydroxyl-functional (meth)acrylic acid ester of at least one polymer chain b) comprises from 1 to 5 (meth)acryloyl groups per molecule.

6. The urethane (meth)acrylate according to claim 1, wherein the at least one hydroxyl-functional (meth)acrylic acid ester of at least one polymer chain b) comprises at least from 1 to 5 free OH groups per molecule.

7. The urethane (meth)acrylate according to claim 1, wherein the at least one polymer chain of the at least one hydroxyl-functional (meth)acrylic acid ester of at least one polymer chain b) is selected from the group consisting of: polyether, polyester, polycarbonate, polysilicone, polysilicone-polyether copolymer and any mixtures thereof.

8. The urethane (meth)acrylate according to claim 1, wherein the at least one hydroxyl-functional (meth)acrylic acid ester of at least one polymer chain b) is selected from the group consisting of: hydroxyl-functional silicone acrylates, hydroxyl-functional polyether acrylates, hydroxyl-functional polyester acrylates, hydroxyl-functional urethane acrylates, hydroxyl-functional epoxy acrylates, copolymers thereof and any mixtures thereof.

9. The urethane (meth)acrylate according to claim 1, wherein the at least one di- or poly-isocyanate is selected from the group consisting of: hexamethylene diisocyanurate (HDI), 5-isocyanato-1-isocyanatomethyl-1,3,3-trimethyl-cyclohexane (isophorone diisocyanate, IPDI), 2,4-diisocyanatotoluene (toluene diisocyanate (TDI)), the isocyanurate containing homopolymers thereof and any mixtures thereof.

10. The urethane (meth)acrylate according to claim 1, wherein the monohydric alcohol c) is selected from the group consisting of hydroxyethylacrylate, hydroxyethylmethylacrylate, hydroxypropylacrylate, hydroxybutylacrylate, hydroxybutylmethacrylate, glycerol acrylate methacrylate, and any mixtures thereof.

11. A process for preparing a urethane (meth)acrylate according to claim 1, which comprises the step of:
   1) reacting at least one di- or poly-isocyanate a) with at least one hydroxyl-functional (meth)acrylic acid ester of at least one polymer chain b) comprising: at least one (meth)acryloyl group, at least one free hydroxyl group and at least one polymer chain, and optionally further reacting a monohydric alcohol, which is not a polymer, containing at least one (meth)acryloyl group c), wherein the equivalent ratio of OH groups of the at least one hydroxyl-functional (meth)acrylic acid ester of at least one polymer chain b) and, if present the monohydric alcohol, which is not a polymer, containing at least one (meth)acryloyl group c) to NCO groups of the at least one di- or poly-isocyanate a) is 0.05:1 to 0.66:1.

12. The process for preparing a urethane (meth)acrylate according to claim 11, wherein the step 1) further includes reacting the monohydric alcohol, which is not a polymer, containing at least one (meth)acryloyl group c).

13. A radiation-curable coating composition, which comprises the urethane (meth)acrylate according to claim 1.

14. A method for coating a radiation-curable coating composition according to claim 13 on a substrate, which comprises the step of applying the radiation-curable coating composition on a substrate and then a step of curing the radiation-curable coating composition by submitting the coated substrate to radiation.

15. The method for coating according to claim 14, wherein the substrate is selected in the group consisting of: wood, plastic, leather, metal, composite, ceramic, paper and glass.

16. A coated substrate which is obtained according to the method for coating of claim 14.

17. A dual cure composition comprising the urethane (meth)acrylate according to claim 1.

18. A conformal coating composition comprising the urethane (meth)acrylate according to claim 1.

19. An adhesion promoter comprising the urethane (meth)acrylate according to claim 1.

* * * * *